United States Patent Office

2,830,993
QUINOLIZINE DERIVATIVES

Arnold Brossi, Otto Schnider, and Max Walter, Basel, Switzerland, assignors to Hoffmann-La Roche Inc., Nutley, N. J., a corporation of New Jersey No Drawing. Application May 18, 1956
Serial No. 585,631

Claims priority, application Switzerland June 3, 1955

6 Claims. (Cl. 260—287)

This invention relates to a novel chemical synthesis and to novel intermediates useful therein. More particularly, the invention relates to a novel method for preparing compounds identified by the generic nomenclature 2-oxo-3-hydrocarbyl-9,10-di(lower alkoxy)-1,2,3,4,6,7 - hexahydro-11b-benzo[a]quinolizine, wherein hydrocarbyl is a hydrocarbon radical having less than eight carbon atoms. This nomenclature is based upon the preferred system established under System No. 1957 in "The Ring Index" by Patterson and Capell, New York (1940).

The invention can be illustrated graphically by the following flow sheet, wherein R represents a lower alkyl radical, $R^1$ represents a lower alkoxy radical and $R^2$ represents a hydrocarbon radical having less than eight carbon atoms:

FLOW SHEET

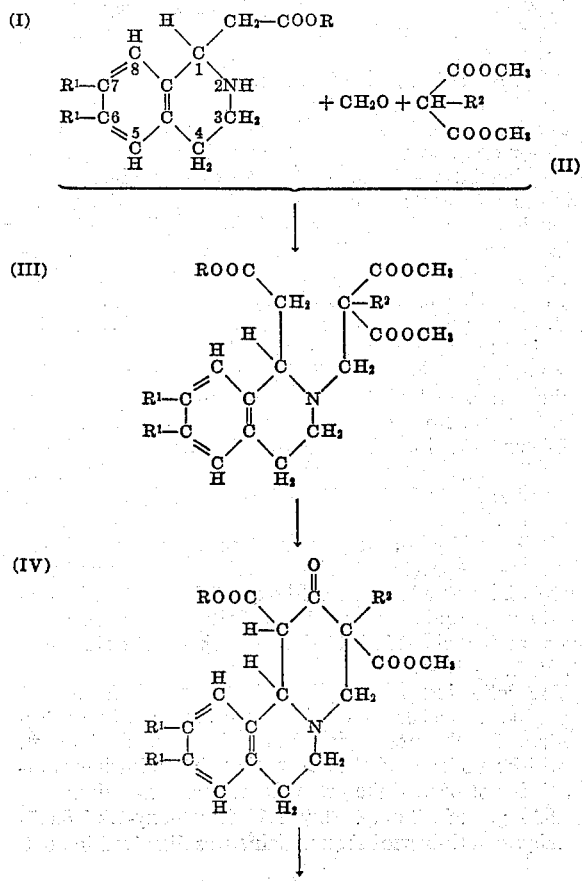

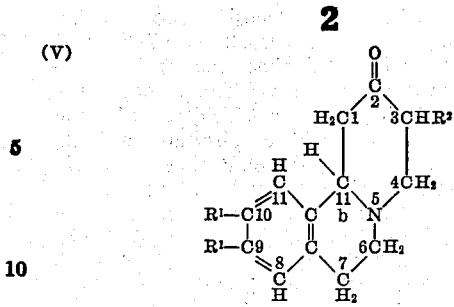

As will be apparent from the flow sheet, one comprehensive embodiment of the invention comprises condensing 1-lower carbalkoxymethyl-6,7-di(lower alkoxy)-1,2,3,4-tetrahydroisoquinoline with a member of the group consisting of formaldehyde and formaldehyde-yielding substances and with α-hydrocarbyl-malonic acid dimethyl ester thereby producing 1-lower carbalkoxymethyl-2-(2,2-dicarbomethoxy-2-hydrocarbyl-ethyl)-6,7-di(lower alkoxy)-1,2,3,4-tetrahydroisoquinoline; cyclizing the latter thereby producing 1-lower carbalkoxy-2-oxo-3-carbomethoxy-3-hydrocarbyl-9,10-di(lower alkoxy)-1,2,3,4,6,7-hexahydro-11b-benzo[a]quinolizine; and hydrolyzing and decarboxylating the latter thereby producing 2-oxo-3-hydrocarbyl-9,10-di(lower alkoxy) - 1,2,3,4,6,7-hexahydro-11b-benzo[a]quinolizine; said hydrocarbyl being a hydrocarbon radical having less than eight carbon atoms.

In an alternative comprehensive embodiment of the invention, the first stage comprises condensing 1-lower carbalkoxymethyl-6,7-di(lower alkoxy)-1,2,3,4-tetrahydroisoquinoline with a member of the group consisting of formaldehyde and formaldehyde-yielding substances and with α-hydrocarbyl-malonic acid, which can be represented by the following formula

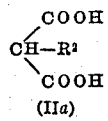

(IIa)

wherein $R^2$ has the same meaning previously indicated, thereby producing 1-lower carbalkoxymethyl-2-(2,2-dicarboxy - 2 - hydrocarbyl-ethyl) - 6,7 - di(lower alkoxy)-1,2,3,4-tetrahydroisoquinoline, which can be represented by the following formula

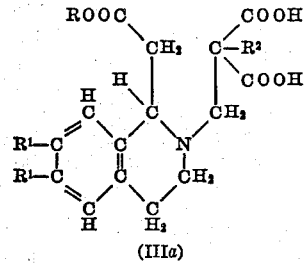

(IIIa)

wherein $R^2$ has the same meaning previously indicated, and reacting the latter with a methylating agent thereby converting both of the free carboxyl groups to the corresponding carbomethoxy groups, i. e. thereby converting (IIIa) to (III). The remainder of the synthesis follows the embodiment previously disclosed.

In a preferred aspect of the invention, R represents methyl or ethyl; $R^1$ represents methoxy or ethoxy; and $R^2$ represents a radical selected from the group consisting of lower alkyl, lower alkenyl and benzyl.

Those starting materials for the process of the invention designated by the Formula I above can be made by known procedures, e. g. by reacting 2-(2,3-di[lower alkoxy]-phenyl)-ethylamine with lower carbalkoxy-acetyl chloride, cyclizing the substituted malonamic ester thus obtained, and catalytically hydrogenating the cyclization product, for example as shown in J. Chem. Soc. (London), 1951, 3464 and ibid., 1953, 2463.

In the first stage of the comprehensive process of the present invention, the 1-lower carbalkoxy-6,7-di(lower alkoxy)-1,2,3,4-tetrahydroisoquinoline reactant (I) is reacted in a Mannich condensation with formaldehyde (or with a substance which yields formaldehyde under the conditions of reaction) and with a substituted malonic acid reactant (II or IIa). In the embodiment wherein the substituted malonic acid reactant is the free acid of Formula IIa above, it is advantageous to mix the three reactants in aqueous medium and permit the mixture to stand for some time at room temperature. The condensation product which crystallizes out, i. e., the ester-acid of Formula IIIa above, is unstable; it is converted to the fully esterified compound of Formula III above, before further reaction. The esterification reaction can be effected, for example, by reacting the ester-acid (IIIa) with diazomethane in ethereal solution; or with dimethyl sulfate in the presence of an alkali metal carbonate, e. g. dimethyl sulfate in aqueous soda solution. In the embodiment wherein the substituted malonic acid reactant is the diester of Formula II above, it is advantageous to heat the reactants in an inert solvent, for example in a lower alkanol. In this embodiment, the tri-ester of Formula III above is obtained directly.

In the second stage of the comprehensive process of the present invention, the tri-ester (III) is cyclized to the compound of Formula IV above, e. g. by the Dieckmann method, i. e. by heating the tri-ester in the presence of an alkaline condensation agent. Advantageously, an alkali metal alkoxide is employed as the alkaline condensation agent and the cyclization is effected by heating the tri-ester with the cyclization agent in an inert solvent, e. g. benzene or toluene.

In the last stage of the comprehensive process of the present invention, the cyclization product (IV) is hydrolyzed and decarboxylated. The hydrolysis-decarboxylation is advantageously effected by heating the cyclization product (IV) with a dilute aqueous solution of a mineral acid, e. g. with dilute hydrochloric acid solution. In this operation, the ester groups are hydrolyzed and simultaneously two molar proportions of carbon dioxide are eliminated. The decarboxylation product of Formula V above is obtained in solution in the reaction medium, as an acid addition salt of (V) with the mineral acid employed. The free base (V) can be precipitated by alkalinization of the mineral acid solution.

The free bases of Formula V form acid addition salts with acids, e. g. with non-toxic acids of the type conventionally employed in the preparation of pharmaceutically acceptable salts of bases; such as strong mineral acids, e. g. hydrochloric acid, sulfuric acid, phosphoric acid and the like; and organic acids, e. g. acetic acid, citric acid, ethanesulfonic acid and the like. The bases and their acid addition salts with said non-toxic acids are useful as medicinals, e. g. as hypotensive, sedative, analgesic and antipyretic agents. Additionally, the bases and their acid addition salts are useful as intermediates in the preparation of other medicinally useful compounds; e. g. by reduction of the 2-oxo group in the compounds of Formula V above, the corresponding 2-hydroxy-3-hydrocarbyl-9,10-di(lower alkoxy)-1,2,3,4,6,7-hexahydro-11b-benzo[a]quinolizine compounds are obtained; these are useful as sedative, antipyretic, anti-inflammatory, analgesic and hypotensive agents.

The invention is further disclosed in the following examples, which are illustrative but not limitative thereof. Temperatures are stated in degrees centigrade, uncorrected.

Example 1

280 g. of 1-carbethoxymethyl-6,7-dimethoxy-1,2,3,4-tetrahydroisoquinoline, 35 g. of paraformaldehyde and 150 g. of monomethylmalonic acid dimethyl ester were refluxed in 1000 ml. of methanol for 24 hours. Upon cooling, 1 - carbethoxymethyl - 2-(2,2-dicarbomethoxy-n-propyl) - 6,7 - dimethoxy - 1,2,3,4 - tetrahydroisoquinoline crystallized. The compound was recrystallized from a mixture of methanol and water and then had M. P. 89°–91°.

28 g. of sodium was dissolved in 500 ml. of methanol and the solution was concentrated to dryness. Then 3500 ml. of toluene and 440 g. of 1-carbethoxymethyl-2-(2,2 - dicarbomethoxy - n - propyl-6,7-dimethoxy-1,2,3,4-tetrahydroisoquinoline of M. P. 89°–91° was added, and the mixture was heated while stirring. The methanol formed by condensation was continuously distilled off, the distillation being interrupted when the boiling point of toluene was reached. The mixture was then refluxed for two hours, and then concentrated to dryness. The residue was dissolved in 6000 ml. of 3 N hydrochloric acid, and was refluxed for 16 hours at 120° thereby effecting hydrolysis and decarboxylation. Then the reaction mixture was cooled and made alkaline with ammonia, thereby precipitating 2-oxo-3-methyl-9,10-dimethoxy - 1,2,3,4,6,7-hexahydro-11b-benzo[a]quinolizine. The product was recrystallized from a mixture of methanol and water, and then had M. P. 138°–140°. The hydrochloride had M. P. 204°–205°.

Example 2

280 g. of 1-carbethoxymethyl-6,7-dimethoxy-1,2,3,4-tetrahydroisoquinoline, 35 g. of paraformaldehyde and 160 g. of monoethylmalonic acid dimethyl ester were suspended in 1000 ml. of methanol and the mixture was refluxed for 24 hours. Upon cooling, 1-carbethoxymethyl - 2 - (2,2-dicarbomethoxy-n-butyl)-6,7-dimethoxy-1,2,3,4-tetrahydroisoquinoline crystallized. Upon recrystallization from methanol, this compound had M. P. 118°–120°.

28 g. of sodium was dissolved in 650 ml. of absolute ethanol, the solution was concentrated to dryness, and the residue was mixed with 3600 ml. of toluene and 451 g. of 1 - carbethoxymethyl - 2-(2,2-dicarbomethoxy-n-butyl-6,7 - dimethoxy - 1,2,3,4 - tetrahydroisoquinoline. The mixture was heated, and the methanol formed by condensation was distilled off until the boiling point of toluene was reached. The mixture was thereupon refluxed for two hours, and then it was concentrated to dryness. The residue was dissolved in 5200 ml. of 3 N hydrochloric acid and heated for 14 hours at 120°, thereby effecting hydrolysis and decarboxylation. The mixture was cooled, washed with diethyl ether, decolorized with carbon, made alkaline and taken up in diethyl ether. The 2-oxo-3-ethyl-9,10-dimethoxy-1,2,3,4,6,7-hexahydro-11b-benzo[a]quinolizine thus obtained was recrystallized from di-n-butyl ether and then had M. P. 110°–112°. The hydrochloride had M. P. 198°–200°. The hydrobromide had M. P. 218°.

Similarly, by starting from 1-carbethoxymethyl-6,7-diethoxy-1,2,3,4-tetrahydroisoquinoline, there was prepared 2-oxo-3-ethyl-9,10-diethoxy-1,2,3,4,6,7-hexahydro-11b-benzo[a]quinolizine; M. P. (after recrystallization from methanol) 116°–118°. The hydrochloride had M. P. 182°–184°.

The following paragraph is illustrative of the use of a product produced by the instant invention as an intermediate for the production of another medicinal agent. It will be understood, however, that the following paragraph is not part of the presently claimed invention:

293 g. of 2-oxo-3-ethyl-9,10-dimethoxy-1,2,3,4,6,7-hexahydro-11b-benzo[a]quinolizine was dissolved in 6000 ml. of glacial acetic acid and was hydrogenated at room temperature, in the presence of a 2 g. of a platinum hydrogenation catalyst made by hydrogenation of platinum dioxide, until the calculated quantity of hydrogen was taken up. The catalyst was filtered off and the reaction mixture was concentrated in vacuo; the residue was taken up in water and made alkaline to phenolphthalein by addition of 3 N ammonia. The basic material which separated was taken up in benzene, the benzene extract was concentrated and mixed with ethyl acetate, thereby yielding a crystalline precipitate. This was recrystallized from a mixture of ethyl acetate and petroleum ether, yielding 2 - hydroxy-3-ethyl-9,10-dimethoxy-1,2,3,4,6,7-hexahydro-11b-benzo[a]quinolizine, colorless needles of M. P. 151°–152°. The hydrobromide had M. P. 231°–233°. The acid sulfate had M. P. 259°–260°. The hydrochloride had M. P. 225°–227°. Both the base and its acid addition salts are useful as sedative, antipyretic, anti-inflammatory and analgesic agents.

*Example 3*

279 g. of 1-carbethoxymethyl-6,7-dimethoxy-1,2,3,4-tetrahydroisoquinoline and 145 g. of monoethylmalonic acid were dissolved in 600 ml. of water, mixed with 110 g. of an aqueous formaldehyde solution containing 30% by weight $CH_2O$ and the mixture was allowed to stand for two hours at room temperature. The precipitate of 1-carbethoxymethyl-2-(2,2-dicarboxy-n-butyl) - 6,7 - dimethoxy-1,2,3,4-tetrahydroisoquinoline was filtered off, washed with a little ice water and then dried in a vacuum desiccator over phosphorus pentoxide; M. P. 66°–68° with decomposition.

425 g. of 1 - carbethoxymethyl-2-(2,2-dicarboxy-n-butyl)-6,7-dimethoxy-1,2,3,4-tetrahydroisoquinoline was suspended in 5000 ml. of diethyl ether and reacted with 8000 ml. of a solution of diazomethane in diethyl ether prepared from 350 g. of nitrosomethylurea. After the addition of the methylating agent, the mixture was stirred for 15 minutes, then filtered and concentrated to dryness. The residue was taken up in methanol. From the filtered solution was crystallized 1-carbethoxymethyl-2-(2,2-dicarbomethoxy-n-butyl)-6,7-dimethoxy - 1,2,3,4 - tetrahydroisoquinoline, M. P. 118°–120°, which was worked up further according to Example 2.

*Example 4*

425 g. of 1-carbethoxymethyl-2-(2,2-dicarboxy-n-butyl)-6,7-dimethoxy-1,2,3,4-tetrahydroisoquinoline (obtained according to Example 3) was dissolved in 2000 ml. of acetone and was mixed with 420 g. of anhydrous potassium carbonate. Then 260 g. of dimethyl sulfate was added dropwise, maintaining the temperature at about 10°. The mixture was filtered, the filter cake was washed with acetone, the combined acetone solutions were concentrated to dryness, and the residue was recrystallized from methanol. There was thus obtained 1-carbethoxymethyl-2-(2,2 - dicarbomethoxy-n-butyl)-6,7-dimethoxy-1,2,3,4-tetrahydroisoquinoline, M. P. 118°–120°. This was worked up further according to Example 2.

*Example 5*

270 g. of 1-carbomethoxymethyl-6,7-dimethoxy-1,2,3,4-tetrahydroisoquinoline (M. P. 84°–86°), 35 g. of paraformaldehyde and 160 g. of monoethylmalonic acid dimethyl ester were suspended in 1000 ml. of methanol and refluxed for 24 hours. Upon cooling, 1-carbomethoxymethyl-2-(2,2 - dicarbomethoxy-n-butyl)-6,7-dimethoxy-1,2,3,4-tetrahydroisoquinoline crystallized. This was recrystallized from methanol-water; M. P. 125°–126°. This tri-ester was converted to 2-oxo-3-ethyl-9,10-dimethoxy-1,2,3,4,6,7-hexahydro-11b-benzo[a]quinolizine in similar manner to Example 2.

*Example 6*

280 g. of 1-carbethoxymethyl-6,7-dimethoxy-1,2,3,4-tetrahydroisoquinoline and 160 g. of monoisopropylmalonic acid were dissolved in 600 ml. of water, the solution was mixed with 110 ml. of an aqueous formaldehyde solution containing 30% by weight $CH_2O$ and the whole was allowed to stand for 48 hours at room temperature. The 1-carbethoxymethyl - 2 - (2,2-dicarboxy-3-methyl-n-butyl) - 6,7 - dimethoxy - 1,2,3,4 - tetrahydroisoquinoline which crystallized was recrystallized from a mixture of dioxan and diethyl ether; M. P. 89° with decomposition. The tri-ester, 1-carbethoxymethyl-2-(2,2-dicarbomethoxy-3-methyl-n-butyl) - 6,7 - dimethoxy-1,2,3,4-tetrahydroisoquinoline, prepared by methylation in similar manner to Example 3, was recrystallized from a mixture of ethyl acetate and petroleum ether; M. P. 64°–65°. Upon Dieckmann cyclization, hydrolysis and decarboxylation in similar manner to Example 2, there was obtained 2-oxo-3-isopropyl - 9,10 - dimethoxy-1,2,3,4,6,7-hexahydro-11b-benzo[a]quinolizine, M. P. 123°–124°. The hydrobromide had M. P. 222°–223°.

*Example 7*

280 g. of 1-carbethoxymethyl-6,7-dimethoxy-1,2,3,4-tetrahydroisoquinoline, 175 g. of monoallylmalonic acid dimethyl ester and 33 g. of paraformaldehyde were refluxed in 1000 ml. of methanol for 24 hours. Upon cooling there was obtained 1-carbomethoxymethyl-2-(2,2-dicarbomethoxy-4-penten-1-yl) - 6,7 - dimethoxy-1,2,3,4-tetrahydroisoquinoline (during the refluxing in methanol, ester exchange took place). This compound had M. P. 93°–95°. Upon cyclization according to Dieckmann, hydrolysis and decarboxylation in similar manner to Example 1, there was obtained 2-oxo-3-allyl-9,10-dimethoxy-1,2,3,4,6,7-hexahydro-11b-benzo[a]quinolizine, M. P. 116°–117°. The hydrobromide had M. P. 204°–205°.

*Example 8*

280 g. of 1-carbethoxymethyl-6,7-dimethoxy-1,2,3,4-tetrahydroisoquinoline, 175 g. of mono-n-butylmalonic acid and 220 ml. of an aqueous formaldehyde solution containing 30% by weight $CH_2O$ were reacted in the manner taught in Example 3. The condensation product, precipitated by means of methylene chloride, i. e. 1-carbethoxymethyl - 2 - (2,2 - dicarboxy-n-hexyl)-6,7-dimethoxy-1,2,3,4-tetrahydroisoquinoline, was methylated by means of an ethereal diazomethane solution in the manner taught in Example 3, yielding 1-carbethoxymethyl-2-(2,2-dicarbomethoxy-n-hexyl)-6,7-dimethoxy - 1,2,3,4 - tetrahydroisoquinoline, M. P. 79°–81°. The latter was subjected to a Dieckmann cyclization, hydrolysis and decarboxylation, in the manner taught in Example 1, yielding 2-oxo-3-n-butyl-9,10-dimethoxy-1,2,3,4,6,7-hexahydro-11b-benzo[a]quinolizine. The latter was recrystallized from n-butanol and then had M. P. 112°–114°. The hydrochloride had M. P. 188°–189°.

The following paragraph is illustrative of the use of a product of the instant invention as an intermediate for the production of another medicinal agent. It will be understood, however, that the following paragraph is not part of the presently claimed invention.

317 g. of 2-oxo-3-n-butyl-9,10-dimethoxy-1,2,3,4,6,7-hexahydro-11b-benzo[a]quinolizine was dissolved in 12,000 ml. of absolute diethyl ether and then 50 g. of pulverized lithium aluminum hydride was added portionwise. After all the lithium aluminum hydride had been added, the reaction mixture was refluxed for four hours. The metal complex formed by the reaction and the excess lithium aluminum hydride were decomposed by addition of water. The ether solution was decanted, dried over sodium sulfate and concentrated. The residual 2-hydroxy - 3 - n - butyl - 9,10 - dimethoxy-1,2,3,4,6,7-hexahydro-11b-benzo[a]quinolizine was crystallized by adding ethyl acetate, and was then recrystallized from a mixture of ethyl acetate and petroleum ether; colorless leaflets of M. P. 126°–128°. The hydrobromide had M. P. 230°–232°. Both the base and its acid addition salts are useful as sedative, antipyretic, antiinflammatory and hypotensive agents.

Example 9

280 g. of 1-carbethoxymethyl-6,7-dimethoxy-1,2,3,4-tetrahydroisoquinoline, 35 g. of paraformaldehyde and 180 g. of mono-n-butylmalonic acid dimethyl ester were refluxed for 24 hours in 1000 ml. of methanol. The basic material was extracted from the reaction mixture by means of 3 N hydrochloric acid. The acid extract was alkalinized with ammonia, then taken up with chloroform, thereby yielding crystalline 1-carbethoxymethyl-2-(2,2 - dicarbomethoxy - n - hexyl) - 6,7-dimethoxy-1,2,3,4-tetrahydroisoquinoline. The latter, after recrystallization from methanol-water, had M. P. 79°–81°. It was worked up further in the manner indicated in Example 8.

Example 10

280 g. of 1-carbethoxymethyl-6,7-dimethoxy-1,2,3,4-tetrahydroisoquinoline, 35 g. of paraformaldehyde and 220 g. of monobenzylmalonic acid dimethyl ester were refluxed for 24 hours in 1000 ml. of methanol. Then the reaction mixture was concentrated to dryness and the residue was dissolved in 3 N hydrochloric acid. The aqueous solution was washed with diethyl ether and was then alkalinized with ammonia. The precipitated basic material was taken up in diethyl ether and the solution was concentrated to dryness. The residue was crystallized from a mixture of diethyl ether and petroleum ether, yielding 1 - carbethoxymethyl - 2-(2,2-dicarbomethoxy-3-phenyl - n - propyl) - 6,7 - dimethoxy-1,2,3,4-tetrahydroisoquinoline, M. P. 97°–98°. Upon Dieckmann cyclization, hydrolysis and decarboxylation in similar manner to Example 1, there was obtained 2-oxo-3-benzyl-9,10-dimethoxy - 1,2,3,4,6,7-hexahydro-11b-benzo[a]quinolizine; M. P., after recrystallization from methanol-water, 139°–141°. Hydrochloride, M. P. 165°–167°.

Example 11

280 g. of 1-carbethoxymethyl-6,7-dimethoxy-1,2,3,4-tetrahydroisoquinoline, 150 g. of mono-isobutylmalonic acid dimethyl ester and 35 g. of paraformaldehyde were refluxed for 24 hours in 1000 ml. of methanol. Upon cooling, 1 - carbethoxymethyl - 2(2,2-dicarbomethoxy-4-methyl - n - pentyl) - 6,7 - dimethoxy - 1,2,3,4-tetrahydroisoquinoline crystallized; M. P., after recrystallization from methanol, 94°–96°. The latter was subjected to Dieckmann cyclization, hydrolysis and decarboxylation in the manner disclosed in Example 1, yielding 2-oxo-3-isobutyl - 9,10 - dimethoxy - 1,2,3,4,6,7-hexahydro - 11b-benzo[a]quinolizine; M. P., after recrystallization from di-isopropyl ether, 126°–128°. The hydrochloride had M. P. 196°–197°.

Example 12

280 g. of 1-carbethoxymethyl-6,7-dimethoxy-1,2,3,4-tetrahydroisoquinoline, 35 g. of paraformaldehyde and 180 g. of mono-n-amylmalonic acid dimethyl ester were refluxed for 24 hours in 1000 ml. of methanol. Then the reaction mixture was concentrated to dryness and the residual 1-carbethoxymethyl-2-(2,2-dicarbomethoxy-n-heptyl)-6,7-dimethoxy-1,2,3,4-tetrahydroisoquinoline was directly subjected to Dieckmann cyclization, hydrolysis and decarboxylation, in similar manner to Example 1. The thus obtained 2-oxo-3-n-amyl-9,10-dimethoxy-1,2,3,4,6,7-hexahydro-11b-benzo[a]-quinolizine, after drying and recrystallization from ethyl acetate petroleum ether, had M. P. 121°–122°. The hydrochloride had M. P. 184°–185°.

Example 13

280 g. of 1-carbethoxymethyl-6,7-dimethoxy-1,2,3,4-tetrahydroisoquinoline, 35 g. of paraformaldehyde and 170 g. of mono-n-hexylmalonic acid dimethyl ester were refluxed for 24 hours in 1000 ml. of methanol. Upon cooling, 1 - carbethoxymethyl - 2-(2,2-dicarbomethoxy-n-octyl)-6,7-dimethoxy-1,2,3,4-tetrahydroisoquinoline crystallized. This was recrystallized from methanol; M. P. 91°–93°. Upon Dieckmann cyclization, hydrolysis and decarboxylation, in similar manner to Example 1, there was obtained 2-oxo-3-n-hexyl-9,10-dimethoxy-1,2,3,4,6,7-hexahydro-11b-benzo[a]quinolizine. This was recrystallized from di-isopropyl ether; M. P. 92°–94°. The hydrochloride had M. P. 173°–175°.

We claim:

1. A process which comprises condensing 1-lower carbalkoxy - methyl-6,7-di(lower alkoxy)-1,2,3,4-tetrahydroisoquinoline with a member of the group consisting of formaldehyde and paraformaldehyde and with α-hydrocarbyl-malonic acid dimethyl ester by heating said reactants together thereby producing 1-lower carbalkoxymethyl - 2 - (2,2 - dicarbomethoxy-2-hydrocarbyl-ethyl)-6,7-di(lower alkoxy)-1,2,3,4-tetrahydroisoquinoline; cyclizing the latter by heating with an alkali metal alkoxide thereby producing 1-lower carbalkoxy-2-oxo-3-carbomethoxy - 3 - hydrocarbyl-9,10-di(lower alkoxy)-1,2,3,4,6,7-hexahydro-11b-benzo[a]quinolizine; and hydrolyzing and decarboxylating the latter by heating with an aqueous solution of a mineral acid thereby producing 2-oxo-3-hydrocarbyl - 9,10-di(lower alkoxy)-1,2,3,4,6,7-hexahydro-11b-benzo[a]quinolizine; said hydrocarbyl being a hydrocarbon radical having less than eight carbon atoms.

2. A process of making 2-oxo-3-hydrocarbyl-9,10-di(lower alkoxy) - 1,2,3,4,6,7-hexahydro-11b-benzo[a]-quinolizine which comprises hydrolyzing and decarboxylating 1-lower carbalkoxy-2-oxo-3-carbomethoxy-3-hydrocarbyl-9,10-di(lower alkoxy)-1,2,3,4,6,7-hexahydro-11b-benzo[a]quinolizine; by heating with an aqueous solution of a mineral acid; said hydrocarbyl being a hydrocarbon radical having less than eight carbon atoms.

3. 1-lower carbalkoxy-2-oxo-3-carbomethoxy-3-hydrocarbyl-9,10-di(lower alkoxy)-1,2,3,4,6,7-hexahydro-11b-benzo[a]quinolizine; said hydrocarbyl being a hydrocarbon radical having less than eight carbon atoms.

4. 1-lower carbalkoxy - 2-oxo-3-carbomethoxy-3-lower alkyl - 9,10 - di(lower alkoxy)-1,2,3,4,6,7-hexahydro-11b-benzo[a]quinolizine.

5. 1-lower carbalkoxymethyl-2-(2,2-dicarbomethoxy-2-hydrocarbyl-ethyl)-6,7-di(lower alkoxy)-1,2,3,4-tetrahydroisoquinoline; said hydrocarbyl being a hydrocarbon radical having less than eight carbon atoms.

6. 1-lower carbalkoxymethyl-2-(2,2-dicarbomethoxy-2-lower alkyl-ethyl) 6,7-di(lower alkoxy)-1,2,3,4-tetrahydroisoquinoline.

References Cited in the file of this patent

Jour. Pharm. Soc., Japan (I), vol 72, 1952, pp. 248–251.

Jour. Pharm. Soc., Japan (II), vol 69, 1949, pp. 85–87.

Jour. Pharm. Soc., Japan (III), vol. 62, 1942, pp. 77–82.

J. Chem. Soc. (London), 1953, pp. 2463–2470.

Experientia, vol. 6, pp. 378–9.